United States Patent [19]
Norton et al.

[11] 3,747,676
[45] July 24, 1973

[54] OIL RECOVERY WITH METHYLOLATED POLYACRYLAMIDE THICKENER

[76] Inventors: Charles J. Norton, 766 Marion, Denver, Colo. 80218; David O. Falk, 3284 So. Winona Ct., Denver, Colo. 80212

[22] Filed: Oct. 29, 1971

[21] Appl. No.: 193,986

[52] U.S. Cl............. 166/275, 166/274, 252/8.55 D
[51] Int. Cl............................................. E21b 43/22
[58] Field of Search................ 252/8.55 D; 166/274, 166/275

[56] References Cited
UNITED STATES PATENTS

| | | | |
|---|---|---|---|
| 2,827,964 | 3/1958 | Sandiford et al. | 252/8.55 X |
| 3,085,063 | 4/1963 | Turbak | 252/8.55 X |
| 3,020,953 | 2/1962 | Zerweck et al. | 166/274 |
| 3,580,337 | 5/1971 | Gogarty | 166/274 |
| 3,039,529 | 6/1962 | McKennon | 252/8.55 X |

*Primary Examiner*—Herbert B. Guynn
*Attorney*—Joseph C. Herring, Richard C. Willson Jr.

[57] ABSTRACT

High molecular weight polyacrylamides are reacted with aqueous solutions of formadehyde, preferably under an inert atmosphere, to cause methylolation and increase their viscosity, screen factor and oil recovery characteristics.

8 Claims, No Drawings

OIL RECOVERY WITH METHYLOLATED POLYACRYLAMIDE THICKENER

BACKGROUND OF THE INVENTION

1. Field of the Invention

The present invention relates to the injection into formations of fluids comprising water classified in Class 166, subclasses -275, -305 of the U.S. Patent Classification System.

2. Description of the Prior Art

A search for pertinent prior art has disclosed the following: *Industrial Engineering Chemistry* 48. 2,132–2,137 which teaches treatment of acrylamide polymers with formalin and sodium bisulfite (or sodium sulfite) for reaction times of 1 to 5 hours at temperatures in the range of 20°–75°C. and suggests the resulting product as a soil conditioner or drilling mud additive, etc., but does not mention secondary recovery of petroleum; Davidson and Sittig, Water Soluble Resins (1968) on page 80 states that polyacrylamide reacts with formaldehyde to give methylolated polyacrylamide under alkaline conditions at room temperature; and further states that "an anionic derivative is obtained from the sulfomethylolation of the [polyacrylamide] polymer with formaldehyde and sodium bisulfite at pH levels of 10 to 12. The product has been shown to be comparable to some of the commercial products used in drilling muds and soil conditioning." No mention is made of secondary recovery of petroleum; U.S. Pat. No. 2,761,834 teaches and claims reacting an acrylamide compound with formaldehyde and sulfurous acid compounds, e.g., sodium bisulfite; Ser. No. 117,692 filed Feb. 22, 1971 (by B.L.Knight), now abandoned, teaches improved flooding with partially hydrolyzed, high molecular weight polyacrylamides effected by incorporating aldehyde, e.g., formaldehyde, as oxygen-scavenging agents in the polymer solution to obtain improved screen factors and minimum viscosity loss during secondary recovery operations]; U.S. Pat. No. 3,085,063 teaches addition of 0.005–5 percent formaldehyde (col. 8, lines 33–34) to reduce viscosity loss during viscous waterflooding using polymers, e.g., sulfonated polymers, copolymers of vinyl aromatics and maleic anhydride, polyethylene oxide or polypropylene oxide types, all of which have molecular weights above about 500,000. This patent does not mention polyacrylamides; U.S. Pat. No. 2,827,964 (col. 2, lines 71–72) teaches "aldehydes" as bactericides in aqueous solutions containing partially hydrolyzed, high molecular weight polyacrylamides and used for recovery of petroleum. This patent does not mention reaction of the aldehydes with the polyacrylamides; U.S. Pat. No. 3,042,611 teaches water flooding with dextran incorporating formaldehyde as a bactericide and stabilizer; U.S. Pat. No. 2,702,791 teaches formaldehyde as an *oxidation* inhibitor in tannin drilling fluid additive, apparently as an oxygen scavenger); U.S. Pat. No. 3,053,765 also teaches formaldehyde as a stabilizer in dextran solutions used for water flooding; U.S. Pat. No. 2,761,834 teaches the product formed by reacting specific acrylamides and formaldehyde with a sulfurous acid compound at specific reaction ratios; various other Patents dealing generally with acrylamides include: Nos. 2,680,110; 2,761,856; 2,909,508; and 3,021,298.

None of the above prior art teaches formaldehyde reaction with high molecular weight unhydrolyzed polyacrylamide prior to use of the polymer as an improved oil recovery agent.

SUMMARY OF THE INVENTION

General Statement of the Invention

According to the invention, high molecular weight unhydrolyzed polyacrylamide in aqueous solution is contacted with formaldehyde which reacts to cause methylolation. It has been discovered that this reaction improves the viscosity, the "screen factor" (defined hereinafter), and the efficiency in recovery of oil in supplemented petroleum recovery processes. By "supplemented petroleum recovery processes" is meant primary, secondary, or tertiary processes for the recovery of petroleum in which displacement fluids are injected into the formation to drive petroleum in place toward a production well. By "screen factor" is meant the results of the test described in Ser. No. 140,931 filed May 6, 1971, page 4, lines 16–30 thereof.

Utility of the Invention

The present invention, by increasing the viscosity, screen factor, and recovery efficiency provides substantially improved efficiencies and economies when used as, or in connection with, displacement fluids for the recovery of petroleum from subterranean formations. In addition, the compositions and processes of the present invention can be utilized for the formulation of controlled density fluids, e.g., for ore flotation, liquid-solid separation processes.

BRIEF DESCRIPTION OF THE DRAWINGS

Because of the nature of the present invention, no drawings are included in the application.

DESCRIPTION OF THE PREFERRED EMBODIMENTS

Starting Materials:

Unhydrolyzed Polyacrylamide: The polyacrylamide utilized with the present invention can be of commercial quality, e.g., that produced by Dow Chemical Co., by American Cyanamide Co., (described in their bulletin, "Chemistry of Acrylamide"), or others, and should be unhydrolyzed. The molecular weight should preferably be in the range of from about 1 to about 100, more preferably from 2 to about 50, and most preferably from about 2 to about 12 million. The commercial grade is commonly a white flaky material which is readily solubilized in water forming a clear water-white solution in water at room temperature.

For the purposes of the present invention, the aqueous solution should contain from about 50 to about 5,000, more preferably from about 100 to about 2,000, and most preferably from about 200 to about 1,500 parts per million by weight of unhydrolyzed polyacrylamide. High-shear mixing should be avoided as it may cause tearing of the molecule reducing effective molecular weight and viscosity increasing properties.

Water: Water will preferably be fresh water but can be brackish or slightly saline, e.g., as in Palestine water.

Formaldehyde: The formaldehyde can be in the form of a liquid solution (formalin) preferably containing from about 37 percent by weight formaldehyde which is the normal commercially available strength. The percent by weight of formaldehyde in the solution is not narrowly critical and can be adjusted to give the desired dilution of the end product, polyacrylamide/formaldehyde aqueous solution. The formaldehyde can be in a gaseous form and bubbled directly into the aqueous solution of unhydrolyzed polyacrylamide. Also, paraformaldehyde can be employed either by heating to form gaseous formaldehyde or by dissolving directly into the aqueous solution of unhydrolyzed polyacrylamide.

Ratio of Reactants: In general, a slight stoichiometric excess of formaldehyde will be preferred though this is not absolutely necessary to the invention. Preferably, from about 0.01 to about 10.0, more preferably from about 0.1 to about 5.0, and most preferably from about 0.5 to about 2.0 moles of formaldehyde will be reacted for each mole of monomer contained in the polyacrylamide. Any excess formaldehyde can be left in the finished product solution for most utilities including supplemented petroleum recovery processes.

pH Control Agent: It has been discovered that the reaction is greatly enhanced by being conducted at a pH within the range of from about 7.5 to about 11, more preferably from 8.0 to about 10.5, and most preferably from 10 to about 10.5. The pH range can be readily achieved by the use of buffers, e.g., trisodium phosphate, sodium polyphosphate, triethanolamine, sodium bicarbonate-carbonate, boric acid-borate, and borax.

Temperature: While not narrowly critical, the reaction between the formaldehyde and the unhydrolyzed polyacrylamide will preferably be conducted in the range of from about 0° to about 300°C., more preferably from about 20° to about 200°C. and most preferably from about 30° to about 90°C.

Pressure: Pressure may vary widely, but will, in most cases, be conveniently near atmospheric pressure. However, where higher temperatures are to be used, additional pressure may be imposed above the reaction mixture, e.g., by the use of inert gases or by the use of compressed air in order to prevent boiling or excessive evaporation of water.

Time: Reaction time is also not narrowly critical and may be in the range of from about 0.1 to about 100 hours, more preferably from about 0.5 to about 50 hours, and most preferably from about 1 to about 10 hours.

Batch or Continuous Basis: While the examples below describe the invention on a batch basis, it may, of course, be practiced on a continuous basis with continuous flows of starting materials into the reactor.

Examples:

EXAMPLES I TO VI

For the following examples, 3.0 grams polyacrylamide are dissolved in 475 ml water. The pH is adjusted to 10.0–10.5 with trisodium phosphate, 2.11 grams formaldehyde is added as a 37 percent solution and an additional 25 ml water is added. Temperature is adjusted to 50°C. and the reaction is allowed to continue for 120 minutes with mild agitation.

The procedure is repeated and samples are taken at various reaction times and the viscosity and screen factor were determined for each of the samples. Results are as given in Table 1.

TABLE 1

| Example | Time, hr | 1.5 RPM Brook viscosity | Screen Factor | Capillary Viscosity at 100°F. |
|---|---|---|---|---|
| I   | 0.0 | 145.6 cp | 34.5 | 31.07 cp |
| II  | 0.5 | 195.0 cp | 48.6 | 36.76 cp |
| III | 1.0 | 200.0 cp | 46.4 | 38.67 cp |
| IV  | 1.5 | 214.0 cp | 61.4 | 40.61 cp |
| V   | 2.0 | 228.0 cp | 47.5 | 41.87 cp |
| VI  | 5.0 | 254.0 cp | 51.7 | 47.36 cp |

It will be noted that the data shows definite viscosity increase over the period of from 0.5 to 5.0 hours in both the Brookfield and Capillary viscometers and a definite screening factor increase is also shown.

Table 2 summarizes a core flood experiment contrasting the effectiveness of unmodified, unhydrolyzed polyacrylamide with methylolated unhydrolyzed polyacrylamide in a tertiary water flood carried out in a Berea sandstone core which has previously been loaded with Henry brine (1,000 ppm $Cl^-$, 6,500 ppm $Na^+$, 276 ppm $Ca^{++}$, 167 ppm $Mg^{++}$) and Henry crude oil to the oil initial level ($O_i$) and initial water level ($W_i$). The cores were then subsequently primary water flooded to residual saturation ($O_r$ and $W_r$) and then flooded with thickened synthetic "Palestine water" containing 500 ppm thickener, 400 ppm NaCl, and 55 ppm $CaCl_2$.

Table 2 summarizes the results for the flood with the unmodified polyacrylamide (Example VII) and with the methylolated, formaldehyde-treated polyacrylamide of the present invention (Example VIII).

The core data indicate that the pore volumes and porosities are nearly identical. Despite some differences in permeabilities between the cores, the results fairly demonstrate the abilities of the aqueous solutions produced according to the present invention as compared to the conventional unhydrolyzed polyacrylamide solutions. Note that the comparative water flood gives closely comparable initial water and oil saturations and residual oil and water saturations as well as efficiencies of primary water flood oil recovery. The subsequent thickened water flood is made with synthetic Palestine brine containing 400 ppm sodium chloride and 55 ppm calcium chloride.

TABLE 2.—SUMMARY OF THICKENED WATERFLOODS

| Example | Run No. | Core data | | | Preparative waterflood,[1] percent | | | | Thickened waterflood | | | |
|---|---|---|---|---|---|---|---|---|---|---|---|---|
| | | PV | Porosity, percent | Permeability | $O_i$ | $W_i$ | $O_r$ | $W_r$ | Eff. | Thickener, 500 p.p.m. | PV injected | Percent $O_r$ |
| VII  | 10,011 | 1,041 | 20.2 | 395.9 | 62.6 | 37.4 | 36.1 | 63.9 | 42.3 | Polyacrylamide | 1.154 | 5.3 |
| VIII | 10,012 | 1,029 | 20.0 | 335.1 | 60.4 | 39.6 | 34.5 | 65.6 | 42.9 | Methylolated polyacrylamide | 1.122 | 10.2 |

[1] 4 ft. x 3 in. Berea fired at 825° F., saturated with Henry brine (11,000 p.p.m. $Cl^-$, 6,500 p.p.m. $Na^+$, 276 p.p.m. $Ca^{++}$, 167 p.p.m. $Mg^{++}$) and Henry Crude to oil initial ($O_i$) and water ($W_i$); subsequently waterflooded to residual saturations ($O_r$ and $W_r$) and then flooded with synthetic "Palestine Water" containing 400 p.p.m. NaCl, 55 p.p.m. $CaCl_2$ and thickener.

Table 3 summarizes results obtained in supplemented oil recovery operations. The advantage of the methylolated polyacrylamide over polyacrylamide are indicated by oil recoveries of 45 percent vs. 27 percent.

Modifications of the Invention

It should be understood that the invention is capable of a variety of modifications and variations which will be made apparent to those skilled in the art by a reading of the specification and which are to be included within the spirit of the claims appended hereto.

TABLE 3.—SUMMARY OF THICKENED WATER SUPPLEMENTED RECOVERY

Polyacrylamide and methylolated product, supplemented thickened water

| Example | Run No. | Core data | | | | Preparative waterflood,[1] percent | | | | | Supplemented thickened waterflood | | |
|---|---|---|---|---|---|---|---|---|---|---|---|---|---|
| | | PV, cc. | Porosity, percent | Permeability, md. | | $O_i$ | $W_i$ | $O_r$ | $W_r$ | Eff. | Thickener, 500 p.p.m. | PV injected | Percent $O_r$ |
| IX | 11,016 | 1,071 | 20.8 | 410.6 | | 61.3 | 38.7 | 36.5 | 63.5 | 40.5 | Polyacrylamide | 1.052 | 27 |
| X | 11,015 | 1,043 | 20.3 | 346.3 | | 61.1 | 38.9 | 33.7 | 66.3 | 44.8 | Methylolated polyacrylamide | 1.069 | 45 |

[1] 0.03 PV of micellar system.

As well as being used as a displacement fluid by themselves, the compositions of the present invention can be used as drive fluids to move "leading edges" of other compositions, e.g., those of U.S. Pat. No. 3,254,714, which in turn displace petroleum from formations.

Reagents can be mixed and immediately injected for reaction within the formation.

Also, the concentrations of unhydrolyzed polyacrylamides discussed under "Description of the Preferred Embodiments" should be understood to refer to concentration during the injection step. Where desired, the contact between formaldehyde and polyacrylamide may be conducted at higher concentrations with subsequent dilution prior to or during injection.

What is claimed is:

1. In a process for the secondary or tertiary recovery of petroleum from formations by injecting aqueous solutions of viscosity-increasing compositions comprising aqueous solutions of unhydrolyzed polyacrylamides to displace petroleum in said formation, the improvement comprising contacting said aqueous solutions of unhydrolyzed polyacrylamide at from about 0° to about 300°C. with from about 0.01 to about 10.0 moles of formaldehyde per mole of acrylamide monomer units contained within said polyacrylamide to form methylolated polyacrylamides and injecting said aqueous solutions into said formations.

2. The process of claim 1 in which from about 0.1 to about 5.0 moles of formaldehyde is reacted for each mole of monomer contained in the polyacrylamide.

3. A process according to claim 1 wherein the reaction is conducted at a pH within the range of about 7.5 to about 11.0.

4. A process according to claim 1 in which the reaction time is from about 0.1 to about 100 hours, and the temperature is in the range of from 0° to about 300°C.

5. A process according to claim 1 wherein the unhydrolyzed polyacrylamides have a molecular weight in the range of from about one million to about one hundred million.

6. A process according to claim 1 wherein the unhydrolyzed polyacrylamide has a molecular weight in the range of from about two million to about fifteen million, the aqueous solution contains from about 100 to about 2,000 parts per million by weight of unhydrolyzed polyacrylamide, from about 0.1 to about 5.0 moles of formaldehyde are reacted for each mole of monomer contained in the polyacrylamide, the pH is maintained in the range of from about 8.0 to about 10.5, the temperature is maintained in the range of from about 0° to about 300°C., and the reaction time is from about 0.5 to about 50 hours.

7. A process according to claim 1 wherein the unhydrolyzed polyacrylamide has a molecular weight in the range of from about five million to about twelve million, there are present from about 500 to about 1,500 parts per million by weight of the unhydrolyzed polyacrylamide, from about 0.5 to about 2.0 moles of formaldehyde are reacted for each mole of monomer contained in the polyacrylamide, the pH is maintained in the range of from about 10.0 to about 10.5, the temperature is in the range of from about 30° to about 90°C., and the reaction time is from about 1 to about 10 hours.

8. A process according to claim 6 wherein the reaction is conducted in the presence of a buffer selected from the group consisting of sodium polyphosphate, trisodium phosphate, triethanolamine, alkali metal bicarbonate-carbonate, boric acid, alkali metal borate, borax, and mixtures thereof.

* * * * *

UNITED STATES PATENT OFFICE
CERTIFICATE OF CORRECTION

Patent No. 3,747,676　　　　　　　　Dated July 24, 1974

Inventor(s) Charles J. Norton et al.

It is certified that error appears in the above-identified patent and that said Letters Patent are hereby corrected as shown below:

Table 3, the second line should read as follows:

-- Polyacrylamide and Methylolated Product. Supplemented Thickened Water --.

Signed and sealed this 19th day of February 1974.

(SEAL)
Attest:

EDWARD M. FLETCHER, JR.　　　　　　C. MARSHALL DANN
Attesting Officer　　　　　　　　　Commissioner of Patents